S. H. DICE.
SOLDERING TOOL OR IMPLEMENT.
APPLICATION FILED JAN. 18, 1921.
1,406,621. Patented Feb. 14, 1922.
2 SHEETS—SHEET 2.
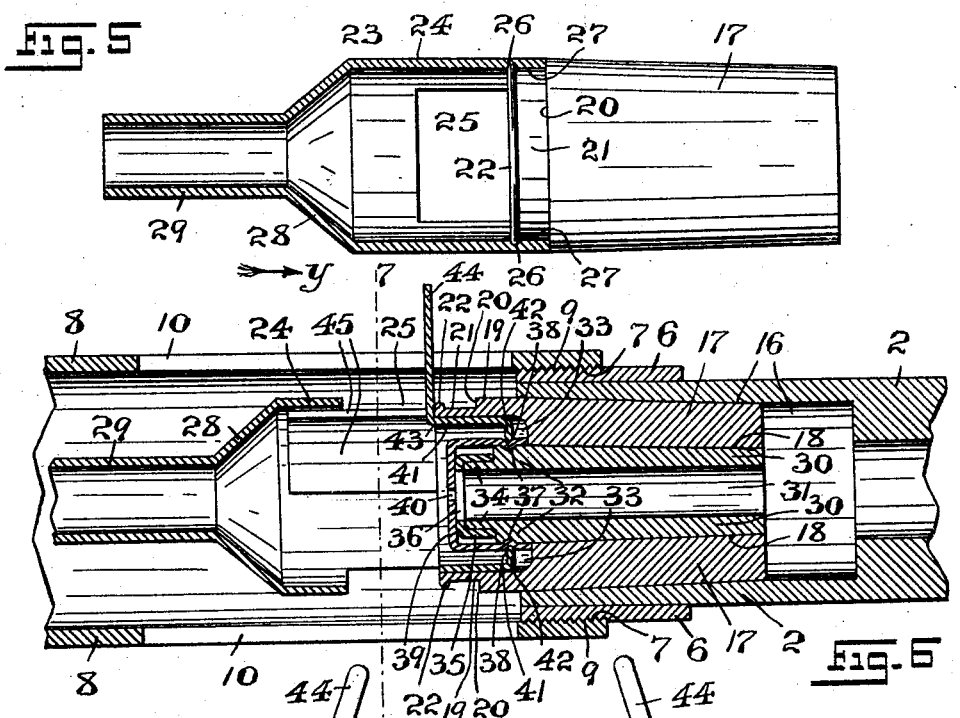
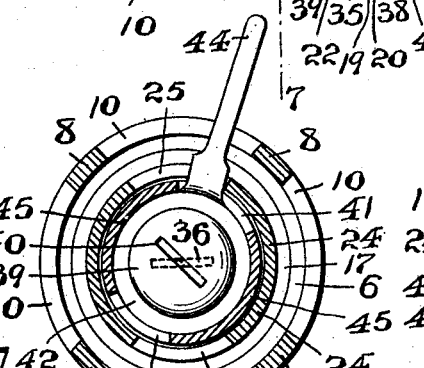
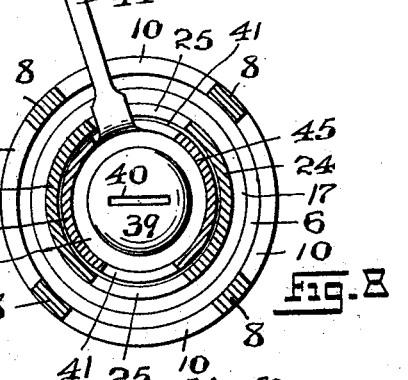
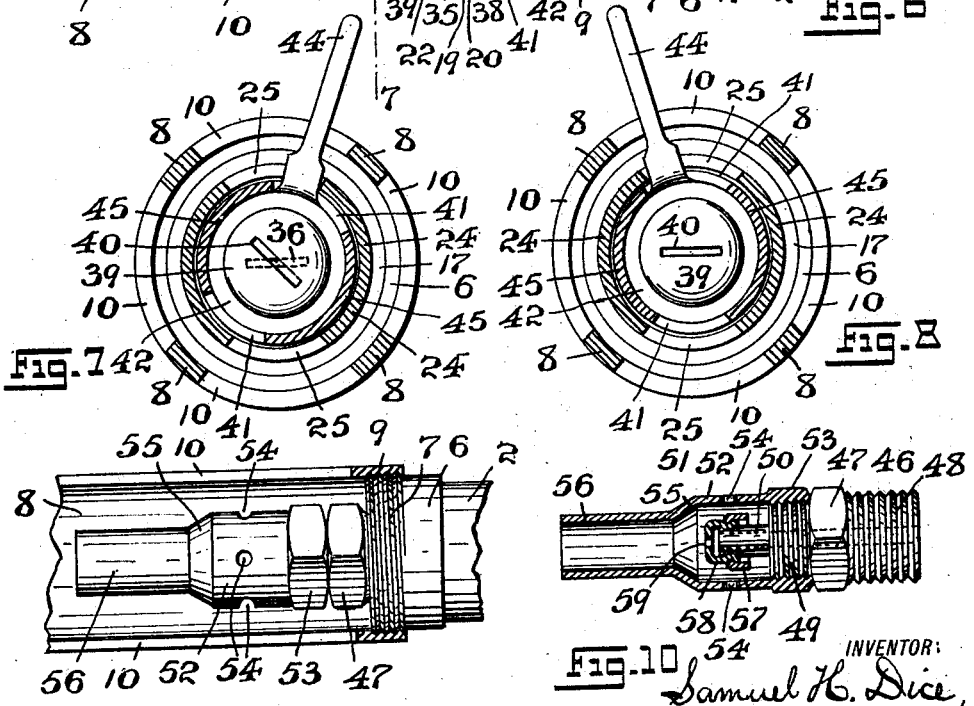
INVENTOR:
Samuel H. Dice,
BY
Fraentzel and Richards.
ATTORNEYS.

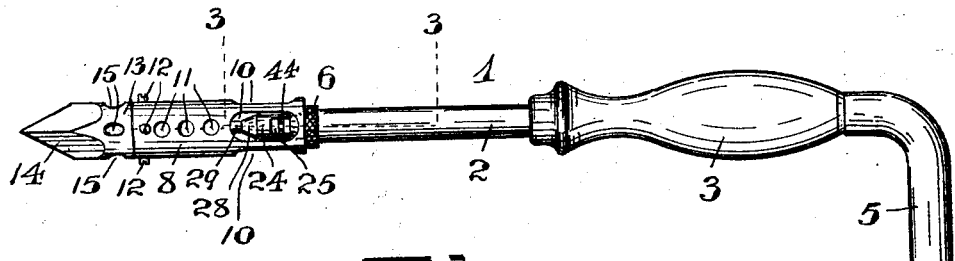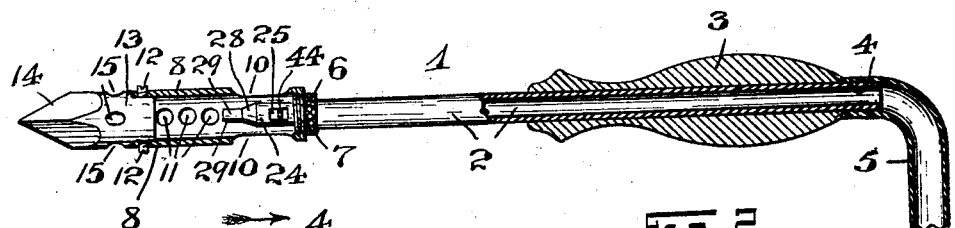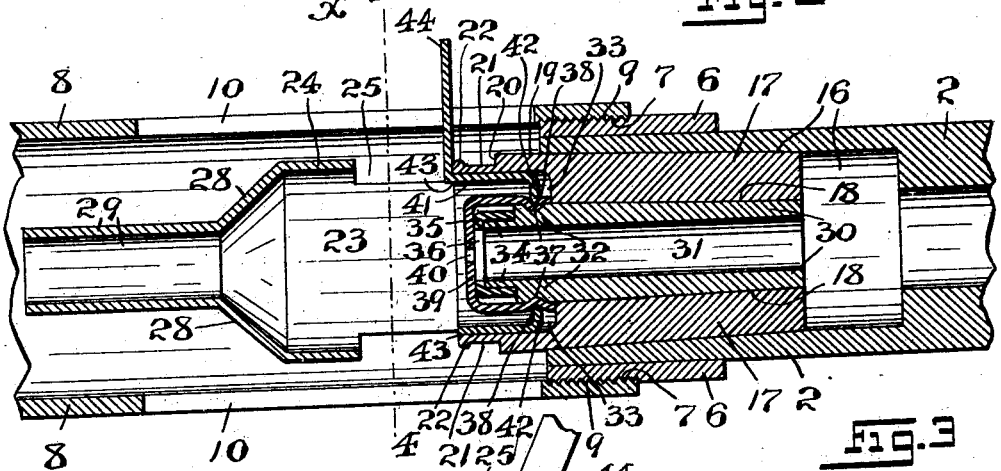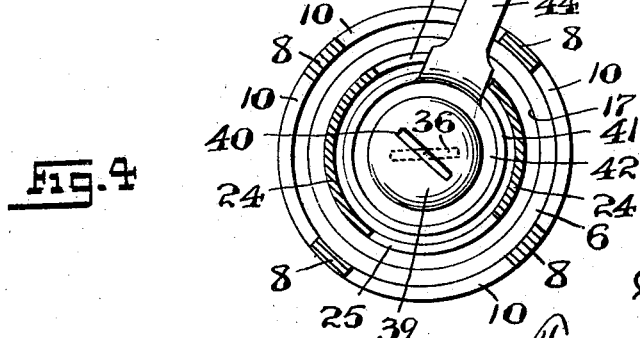

UNITED STATES PATENT OFFICE.

SAMUEL H. DICE, OF NEWARK, NEW JERSEY.

SOLDERING TOOL OR IMPLEMENT.

1,406,621.    Specification of Letters Patent.    Patented Feb. 14, 1922.

Application filed January 18, 1921. Serial No. 438,139.

*To all whom it may concern:*

Be it known that I, SAMUEL H. DICE, a citizen of the United States, residing at Newark, in the county of Essex and State of New Jersey, have invented certain new and useful Improvements in Soldering Tools or Implements; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in soldering tools; and, the present invention has reference, more particularly, to a novel and simple construction of soldering tool or iron adapted for easy attachment to a gas-conveying tube, the gas, such as illuminating gas, being conducted through the main body of the tool, and at a point near the soldering end of the tool being suitably intermixed with air which, at that point is also conveyed into the interior of the tool, so as to provide excessive heat for the proper use and manipulation of the tool during the soldering operation.

With the above in view, the present invention has for its principal object to provide a hollow or chambered soldering tool, having a solid soldering end, into which hollow or chambered tool illuminating gas is adapted to be fed and mixed with air, the chambered portion or body of the tool being provided with a simply constructed and effectively operating valve-actuating means, for properly controlling the supply of gas, so as to admit the proper degree of gas that may be required.

The present invention has for its further object to so arrange and construct the various elements of the soldering tool that in addition to said valve-actuating means for controlling the supply of gas, with a slight change, the said means may also be employed for regulating the supply of air.

The invention has for its further object to provide a novel and simply constructed soldering tool of the general character hereinafter more fully set forth, and for the various purposes above stated, with a view of providing a handy soldering iron for household purposes.

Other objects of the present invention not at this time more particularly enumerated will be clearly understood from the following detailed description of the present invention.

With the various objects of the present invention in view, the said invention consists, primarily, in the novel soldering tool hereinafter more fully set forth in the following specification; and, the said invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:

Figure 1 is a side elevation of a soldering tool, showing one embodiment of the principles of the present invention; and Figure 2 is a longitudinal vertical section of the same.

Figure 3 is an enlarged detail sectional representation of a portion of the same, said section being taken on line 3—3 in said Figure 1; and Figure 4 is an enlarged transverse vertical section of the tool, said section being taken on line 4—4 in said Figure 3, looking in the direction of the arrow $x$.

Figure 5 is a view partly in elevation and partly in horizontal section of one of the members of the gas-regulating means of the tool, the valve-actuating lever for manipulating the gas-inlet or valve, however, being omitted from said view.

Figure 6 is a longitudinal vertical section of the tool, similar to the section represented in said Figure 3, the gas-inlet or valve-actuating means in this construction being slightly changed so as to be adapted to move a shutter for enlarging or decreasing the air-inlet of the tool; Figure 7 is a transverse vertical section of the parts as represented in said Figure 6, said section being taken on line 7—7 in said Figure 6, looking in the direction of the arrow $y$; and Figure 8 is a similar sectional representation, showing the various parts in the operated position for admission of both a maximum quantity of gas, as well as a maximum quantity of air.

Figure 9 is a detail view, partly in section and partly in elevation, of a modified gas and air-mixing means adapted for use with the soldering tool; and Figure 10 is a longitudinal section of the said gas and air-mixing means.

Referring now to the several figures of the drawings, the reference-character 1 indicates one form of complete soldering tool made according to and embodying the principles of the present invention, the same comprising a main tubular element 2, upon a portion of which is suitably mounted a suitably formed handle 3, and from one end-portion of which extends an end 4 of said element 2 for attachment thereto of the end of a flexible tubing or hose 5 for conveying gas, such as illuminating gas, into and through said main tubular member or element 2, as will be evident from an inspection of Figure 2 of the drawings. Suitably mounted upon the other end of said member or element 2, by brazing or otherwise is a sleeve or collar, 6, which is externally screw-threaded, as at 7, for the screwing thereon of the internally screw-threaded end-portion 9 of a tubular flame-conveying member 8 formed with air-inlets 10 and a series of perforations, as 11. Suitably secured to the opposite end of said tubular member 8, by means of screws 12, or other suitable fastening means, is a suitable soldering member 13, which is preferably pointed, as at 14, and is formed with a number of heat-conveying ducts or passages 15, substantially as shown in said Figure 2 of the drawings. The previously mentioned tubular member or element 2, as will be seen from an inspection of Figures 2 and 5, has an enlarged chambered portion 16, the inner wall-portions of which are tapered substantially as shown, and fixed in said chambered portion 16, by being suitably driven or forced into the same, so as to be held therein by friction, is a cone-shaped block or plug 17, which is provided with a longitudinally extending duct 18. A portion 19 of said block or plug 17 projects beyond the chambered end-portion of said tubular member or element 2, said projecting portion 19 having an annular off-set or shoulder 20 from which extends a portion 21 which is formed with a marginal head 22, for rotatably connecting with said portion 21, a mixing element 23.

This mixing element consists, essentially, of a main tubular body-portion 24 which is provided with oppositely located openings 25, the said portion 24 being also provided with an internally disposed groove, as 26, which is in registration with the previously mentioned head 22, for maintaining the open end-portion 27 of said body-portion 24 in its operative relation upon the portion 21 of the block or plug 17, so as to be rotatably connected with the latter, but incapable of being separated therefrom, as will be evident. The opposite end-portion of the said tubular body-portion 24 is preferably made funnel-shaped, as at 28, said funnel-shaped member 28 terminating in a tubular end-member or element 29, which is concentrically disposed within the previously mentioned tubular member 8, substantially as shown in the several figures of the drawings.

Fitted in said tubular duct 18 of the block or plug 17 is a suitably constructed gas-valve, the same comprising a tubular body 30 having a longitudinally extending duct 31 one end of which is in communication with the enlarged chambered portion 16 of the main tubular member or element 2, as shown in Figures 3 and 5 of the drawings. The forward end-portion 32 extends into a recessed portion 33 of the previously mentioned block or plug 17, said end-portion 32 being formed with a reduced part 34 forming a receiving member upon which is suitably fixed an end-cap or shell 35 which is provided with a diametrically extending slit or narrow opening, as 36. Enclosing said end-cap 35 and rotatably secured upon the end-portion 32 of the tubular body 30, by means of registering parts 37 and 38, or in any other suitable manner, is another cap or shell 39 which is also provided with a diametrically extending slit or narrow opening, as 40, which extends under normal initial conditions angularly across the slit or narrow opening 36 of the cap or shell 35. That the said cap or shell 39 may be suitably rotated upon the end-shell or cap 35, there is rotatably disposed within the recess 33 of the block or plug 17, a hollow or cup-shaped body, as 41, said body having a flanged portion 42 which is fitted into the depression 38 of the said cap or shell 39, and is positively secured in said depression 38 in any suitable manner. Connected with said hollow or cup-shaped body 41 and projecting angularly from the marginal edge 43 of the said body is a manipulating member 44, in the form of a handle, which extends into and through a pair of the oppositely located openings 25 and 10 of the mixing element 23 and of the tubular member 8, in a manner as represented more particularly in Figures 3 and 4 of the drawings. From an inspection of said Figure 4 it will readily be seen how the admission of the gas may be regulated, as required, by the movement of said handle 44 in said openings, the maximum movement of said handle being such, that the slit or opening 40 in the rotary or oscillatorily mounted cap 39 will be moved directly over the slit or opening 36 in the fixed cap 35.

If desired, the said hollow or cup-shaped body 41, as will be seen from an inspection of Figures 6, 7 and 8, may also be provided with suitably-formed baffles or wings, as 45, which extend forwardly from the marginal edge 43 of said body 41, into the interior of the body-portion 24 of the mixing element 23, said baffles or wings 45 forming movable shutters for the air-inlet openings 25 in said body 24, whereby the said openings may be made larger or smaller, according to the direction of the movement of the cap or shell 39, so that the quantity of air admitted into the mixing chamber is also regulated with relation of the quantity of gas admitted through the regulating valve, as will be clearly evident.

In Figures 9 and 10, I have shown a slightly modified construction of gas-inlet or valve, the same comprising a tubular nipple 46, formed with a centrally disposed wrench-receiving portion 47 for screwing the exteriorly screw-threaded end 48 of said nipple into a correspondingly interiorly screw-threaded end-portion of the main tubular member or element 2 of the tool, said nipple having another screw-threaded end, as 49, from which extends a tubular outlet 50, said screw-threaded end 49 having suitably screwed thereon, the interiorly screw-threaded end-portion 53 of a tubular mixing element 51. This mixing element comprises a main body-portion 52, of which the said end-portion 53 forms a part, said body-portion 52 being provided with suitably located air-receiving perforations or openings 54. The opposite end-portion of said tubular body-portion 52 is also preferably funnel-shaped, as at 55, said funnel-shaped member 55 terminating in a tubular outlet member or element 56, which is concentrically disposed within the tubular main member 8 of the soldering iron, and which member 8 is connected with the tubular member 2 of the tool by means of the sleeve or collar 6, in the manner described in the foregoing description in connection with the construction of the soldering irons illustrated in Figures 1 to 8 inclusive.

Suitably mounted upon the end-portion of the outlet-member 50, and fixed thereon by means of a retaining sleeve or collar 57, is a cap or shell 58 which is formed with an outlet slit or opening, as 59, for admission of the gas into the mixing chamber of the element 51, as will be clearly understood.

From the foregoing description, it will be seen that I have devised a simply constructed and an operative soldering tool or implement which can be easily manipulated, and is very handy as a household tool.

The manipulation and operations of the various parts for regulating the supply of the gas, as well as that of the air, so as to produce a proper heating mixture, will be clearly understood from an inspection of the several figures of the drawings, and any further description of the same is therefore deemed unnecessary.

Of course I am aware, that some changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts as illustrated in the accompanying drawings.

I claim:—

1. A soldering tool comprising a main tubular gas-conveying element, one end-portion of which is adapted for attachment thereto of a gas-conveying tubing, a handle mounted upon said gas-conveying element, a tubular flame-conveying member connected with and extending from the other end-portion of said gas-conveying element, said flame-conveying member being provided with air-inlet openings, a soldering member connected with said flame-conveying member, a gas-valve comprising a tubular body connected with and in communication with said gas-conveying element, said body being formed with an outlet-portion, a cap mounted in a fixed position over said outlet-portion, said cap being provided with an opening, a second cap rotatably mounted in position upon said outlet-portion, said second-mentioned cap enclosing said first-mentioned cap, means connected with said second-mentioned cap for rotating the same, and a mixing element within said flame-conveying member connected with said gas-valve, said mixing element comprising a tubular body within which said caps are disposed, said body being provided with air-inlets.

2. A soldering tool comprising a main tubular gas-conveying element, one end-portion of which is adapted for attachment thereto of a gas-conveying tubing, a handle mounted upon said gas-conveying element, a tubular flame-conveying member connected with and extending from the other end-portion of said gas-conveying element, said flame-conveying member being provided with air-inlet openings, a soldering member connected with said flame-conveying member, a gas-valve comprising a tubular body connected with and in communication with said gas-conveying element, said body being formed with an outlet-portion, a cap mounted in a fixed position over said outlet-portion, said cap being provided with an opening, a second cap rotatably mounted in position upon said outlet-portion, said second-mentioned cap enclosing said first-mentioned cap, means connected with said second-mentioned cap for rotating the same, and a mixing element within said flame-conveying member connected with said gas-valve, said mixing element comprising a tubular body within which said caps are disposed, said body being provided with air-inlets, and a funnel-shaped flame-delivering outlet.

3. A soldering tool comprising a main tubular gas-conveying element, one end-portion of which is adapted for attachment thereto of a gas-conveying tubing, a handle mounted upon said gas-conveying element, a tubular flame-conveying member connected with and extending from the other end-portion of said gas-conveying element, said flame-conveying member being provided with air-inlet openings, a soldering member connected with said flame-conveying member, said tubular gas-conveying element being provided with an enlarged and tapering gas-receiving chamber, a cone-shaped tubular plug fixed within said chamber, said plug having a recessed end-portion projecting from said chamber, said end-portion being provided with a marginal bead, a gas-valve comprising a tubular body disposed in the tubular portion of said plug, said body being formed with an outlet-portion extending into the recessed portion of said plug, a cap mounted in a fixed position over said outlet-portion, said cap being provided with an opening, a second cap rotatably mounted in position upon said outlet-portion, said second-mentioned cap enclosing said first-mentioned cap, and also having an opening, a cup-shaped body within the recessed end-portion of said plug, said cup-shaped body being mounted and secured upon said second-mentioned cap, and a handle extending from said cup-shaped body for rotating the same and said second-mentioned cap, and a mixing element within said flame-conveying member, said mixing element comprising a tubular body within which said caps are disposed, said body being provided with air-inlets and having an internally disposed groove in registration with the marginal bead of said plug and in which said bead is secured in fixed relation.

4. A soldering tool comprising a main tubular gas-conveying element, one end-portion of which is adapted for attachment thereto of a gas-conveying tubing, a handle mounted upon said gas-conveying element, a tubular flame-conveying member connected with and extending from the other end-portion of said gas-conveying element, said flame-conveying member being provided with air-inlet openings, a soldering member connected with said flame-conveying member, said tubular gas-conveying element being provided with an enlarged and tapering gas-receiving chamber, a cone-shaped tubular plug fixed within said chamber, said plug having a recessed end-portion projecting from said chamber, said end-portion being provided with a marginal bead, a gas-valve comprising a tubular body disposed in the tubular portion of said plug, said body being formed with an outlet-portion extending into the recessed portion of said plug, a cap mounted in a fixed position over said outlet-portion, said cap being provided with an opening, a second cap rotatably mounted in position upon said outlet-portion, said second-mentioned cap enclosing said first-mentioned cap, and also having an opening, a cup-shaped body within the recessed end-portion of said plug, said cup-shaped body being mounted and secured upon said second-mentioned cap, and a handle extending from said cup-shaped body for rotating the same and said second-mentioned cap, and a mixing element within said flame-conveying member, said mixing element comprising a tubular body within which said caps are disposed, said body being provided with air-inlets and having an internally disposed groove in registration with the marginal bead of said plug and in which said bead is secured in fixed relation, and a funnel-shaped flame-delivering element connected with and extending from the tubular body of said mixing element.

5. A soldering tool comprising a main tubular gas-conveying element, one end-portion of which is adapted for attachment thereto of a gas-conveying tubing, a handle mounted upon said gas-conveying element, a tubular flame-conveying member connected with and extending from the other end-portion of said gas-conveying element, said flame-conveying member being provided with air-inlet openings, a soldering member connected with said flame-conveying member, said tubular gas-conveying element being provided with an enlarged and tapering gas-receiving chamber, a cone-shaped tubular plug fixed within said chamber, said plug having a recessed end-portion projecting from said chamber, said end-portion being provided with a marginal bead, a gas-valve comprising a tubular body disposed in the tubular portion of said plug, said body being formed with an outlet-portion extending into the recessed portion of said plug, a cap mounted in a fixed position over said outlet-portion, said cap being provided with an opening, a second cap rotatably mounted in position upon said outlet-portion, said second-mentioned cap enclosing said first-mentioned cap, and also having an opening, a cup-shaped body within the recessed end-portion of said plug, said cup-shaped body being mounted and secured upon said second-mentioned cap, and a handle extending from said cup-shaped body for rotating the same and said second-mentioned cap, and a mixing element within said flame-conveying member, said mixing element comprising a tubular body within which said caps are disposed, said body being provided with air-inlets and having an internally disposed groove in registration with the marginal bead of said plug and in which said bead is secured in fixed relation, and a plurality of wings or baffles extending from the cup-shaped body within the recessed end portion of said plug, said wings or baffles extending into the interior of the tubular body of said mixing element and in front of the air-inlets thereof.

6. A soldering tool comprising a main tubular gas-conveying element, one end-portion of which is adapted for attachment thereto of a gas-conveying tubing, a handle mounted upon said gas-conveying element, a tubular flame-conveying member connected with and extending from the other end-portion of said gas-conveying element, said flame-conveying member being provided with air-inlet openings, a soldering member connected with said flame-conveying member, said tubular gas-conveying element being provided with an enlarged and tapering gas-receiving chamber, a cone-shaped tubular plug fixed within said chamber, said plug having a recessed end-portion projecting from said chamber, said end-portion being provided with a marginal bead, a gas-valve comprising a tubular body disposed in the tubular portion of said plug, said body being formed with an outlet-portion extending into the recessed portion of said plug, a cap mounted in a fixed position over said outlet-portion, said cap being provided with an opening, a second cap rotatably mounted in position upon said outlet-portion, said second-mentioned cap enclosing said first-mentioned cap, and also having an opening, a cup-shaped body within the recessed end-portion of said plug, said cup-shaped body being mounted and secured upon said second-mentioned cap, and a handle extending from said cup-shaped body for rotating the same and said second-mentioned cap, and a mixing element within said flame-conveying member, said mixing element comprising a tubular body within which said caps are disposed, said body being provided with air-inlets and having an internally disposed groove in registration with the marginal bead of said plug and in which said bead is secured in fixed relation, a funnel-shaped flame-delivering element connected with and extending from the tubular body of said mixing element, and a plurality of wings or baffles extending from the cup-shaped body within the recessed end portion of said plug, said wings or baffles extending into the interior of the tubular body of said mixing element and in front of the air-inlets thereof.

7. A soldering tool comprising a main tubular gas-conveying element, a tubular flame-conveying member connected therewith, said last-mentioned member having soldering end, and a gas-valve connected with said gas-conveying element, said gas-valve comprising a tubular body, a cap mounted in a fixed position upon one end of said tubular body, said cap having an outlet opening, and a second cap rotatably mounted over said first-mentioned cap, said second-mentioned cap being also provided with an outlet opening.

8. A soldering tool comprising a main tubular gas-conveying element, a tubular flame-conveying member connected therewith, said last-mentioned member having soldering end, and a gas-valve connected with said gas-conveying element, said gas-valve comprising a tubular body, a cap mounted in a fixed position upon one end of said tubular body, said cap having an outlet opening, a second cap rotatably mounted over said first-mentioned cap, said second-mentioned cap being also provided with an outlet opening, and means connected with said second-mentioned cap for rotating the same, consisting of a cup-shaped body mounted upon and secured to said second-mentioned cap, and a handle connected with and extending from said cup-shaped body.

9. A soldering tool comprising a main tubular gas-conveying element, a tubular flame-conveying member connected therewith, said last-mentioned member having soldering end, and a gas-valve connected with said gas-conveying element, said gas-valve comprising a tubular body, a cap mounted in a fixed position upon one end of said tubular body, said cap having an outlet opening, a second cap rotatably mounted over said first-mentioned cap, said second-mentioned cap being also provided with an outlet opening, and means connected with said second-mentioned cap for rotating the same, consisting of a cup-shaped body mounted upon and secured to said second-mentioned cap, a handle connected with and extending from said cup-shaped body, and a plurality of wings or baffles also connected with and extending from said cup-shaped body.

In testimony that I claim the invention set forth above I have hereunto set my hand this 15th day of January, 1920.

SAMUEL H. DICE.

Witness:
FREDK. C. FRAENTZEL.